United States Patent [19]
Granger

[11] Patent Number: 5,887,842
[45] Date of Patent: Mar. 30, 1999

[54] SIGN POST WITH STRESS-DEFINED BREAKAWAY SPLICE

[76] Inventor: Mark S. Granger, 285 Longfellow Ave., Worthington, Ohio 43085

[21] Appl. No.: 949,262

[22] Filed: Oct. 13, 1997

Related U.S. Application Data

[63] Continuation-in-part of Ser. No. 626,126, Apr. 1, 1996.
[51] Int. Cl.⁶ .................................................. E01F 9/018
[52] U.S. Cl. ............................. 248/548; 52/98; 248/900; 403/2
[58] Field of Search .................................. 52/165, 169.9, 52/98; 248/548, 900; 404/10; 403/2

[56] References Cited

U.S. PATENT DOCUMENTS

| | | |
|---|---|---|
| 2,449,056 | 9/1948 | Clark . |
| 3,004,637 | 10/1961 | Heintzmann . |
| 3,900,269 | 8/1975 | Pavlot . |
| 4,126,403 | 11/1978 | Sweeney et al. . |
| 4,435,106 | 3/1984 | Förster et al. . |
| 4,435,107 | 3/1984 | Sweeney . |
| 4,490,062 | 12/1984 | Chisholm . |
| 4,615,156 | 10/1986 | Deike . |
| 4,858,876 | 8/1989 | Moreno . |
| 4,926,592 | 5/1990 | Nehls . |
| 4,928,446 | 5/1990 | Alexander, Sr. . |
| 5,004,366 | 4/1991 | Simmons . |
| 5,066,163 | 11/1991 | Whitaker . |
| 5,088,683 | 2/1992 | Briden . |
| 5,090,348 | 2/1992 | Hugron . |
| 5,125,194 | 6/1992 | Granger . |
| 5,165,818 | 11/1992 | Newhart . |
| 5,205,236 | 4/1993 | Hughes . |
| 5,214,886 | 6/1993 | Hugron . |
| 5,273,371 | 12/1993 | Hugron . |
| 5,480,121 | 1/1996 | Rice et al. . |

OTHER PUBLICATIONS

Listing of FHWA Accepted Breakaway Sign Supports; Nov. 7, 1995.

*Primary Examiner*—Michael Safavi
*Attorney, Agent, or Firm*—Mueller and Smith, L.P.A.

[57] ABSTRACT

A sign post is formed of a lower support component for anchoring within terrain, leaving an exposed upper portion at the surface of such terrain. The support component includes an array of longitudinally regularly spaced apertures. An upper support component having the same regular spacing of apertures is attached to the lower component at the exposed portion through the utilization of a splicing technique. The splice is formed as a stress transfer component having two strategically positioned boltways therein. These boltways are spaced apart longitudinally a distance representing an even integer of the upper and lower component aperture spacings. The boltways are configured having a small threaded region adjacent one surface. Bolts having a threadless shank and threaded region therebelow are slidably inserted through one of the components into the stress transfer whereupon they are rotated for preassembly engagement with the minor threaded regions of the stress transfer component. In the course of sign assemblage, the bolts are tightened to deform or strip the threads within the stress transfer component. When the splice is completed by the addition of nuts to the ends of the bolts, the bolts are substantially unrestricted by threaded engagement within the stress transfer component and the splice or joint affected is more structurally definable, permitting the bolts to yield along their lengths under load.

20 Claims, 3 Drawing Sheets

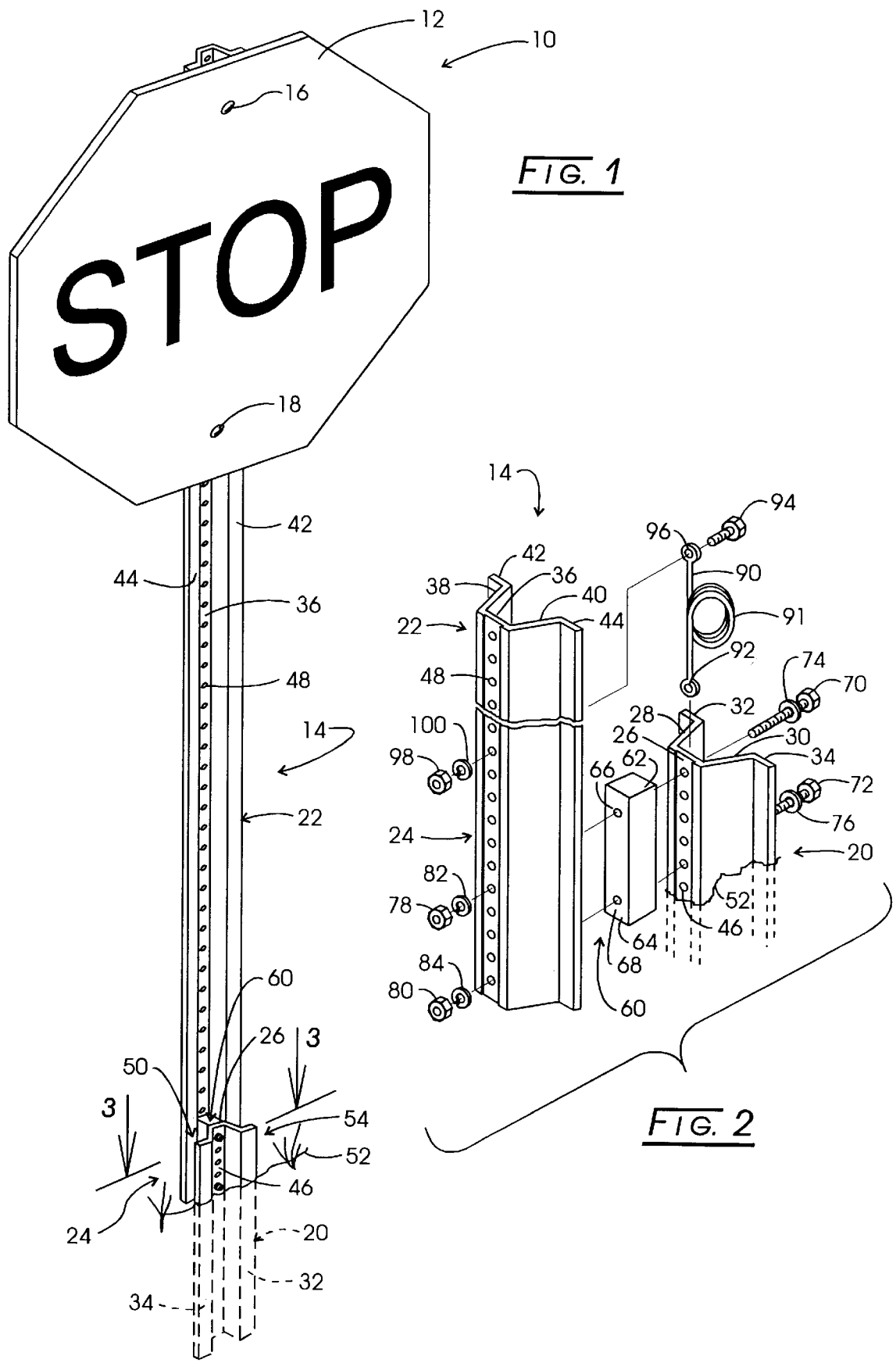

SIGN POST WITH STRESS-DEFINED BREAKAWAY SPLICE

CROSS-REFERENCE TO RELATED APPLICATIONS

This application is a continuation-in-part of U.S. application Ser. No. 08/626,126, filed Apr. 1, 1996, entitled Sign Post with Breakaway Splice.

BACKGROUND

Signage employed with roadway systems has been the subject of regulatory and institutional investigation essentially since the emergence of the motor vehicle. The structural characteristics of road or highway signs vary from major bridging entities to the relatively small and ubiquitous stop sign. Regulations and specifications promulgated for signage extend not only to a standardization of their visual cuing aspects, but also to vehicular safety considerations. For example, the Federal Highway Administration evaluates sign structures for conformance with the AASHTO (American Association of State Highway Transportation Officials) "Standard Specifications for Structural Supports for Highway Signs, Luminaires, and Traffic Signals", as well as the NCHRP (National Cooperative Highway Research Program) Report 350 entitled "Recommended Procedures for Safety Performance Evaluation of Highway Features".

The mounting or supporting structures for stop signs and the like, generally are categorized as "small sign supports". Traditionally, the designs for these small supports have been based upon two considerations. First, their mounting should be sufficiently robust to withstand torsional and other stresses associated with wind loads. When typically mounted upon single sign posts, stop signs and the like become airfoils to wind loads with resultant induced torsional and other stresses. A traffic control sign such as a stop sign can pose serious hazards when blown down by virtue of its cuing absence. Secondly, it is reasonably anticipated that such signs will be struck in the course of roadway accidents. Accordingly, they must be designed to break away under specified impact conditions such that they present no danger to vehicle occupants. For example, as an errant vehicle strikes a signpost, the post should break away such that no part of it penetrates the passenger compartment and no passengers experience a negative change in relative velocity greater than 5 meters per second. To assure appropriate breakaway characteristics, many signposts are provided having two components. A first lower support or anchoring component is provided which is driven or otherwise secured in the ground with a small portion of it, for example about 4 inches, protruding from terrain surface. Then, an elongate upper component carrying the sign at one end is attached to the protruding portion of the lower component using a splice form of connection and connectors or fasteners having a breakaway characteristic such as break away bolts which fail under predetermined tensile stresses. Fortuitously, certain of the signposts also are observed to break additionally at the point of impact with a vehicle.

Signpost structures may take on a variety of cross-sectional configurations and generally are formed of steels which may exhibit a variety of characteristics. The cross-sectional configurations may, for example, be round or pipe-like, or very often are formed as flanged channels having a cross-sectional shape somewhat emulating a hat. Steel forming such posts generally exhibits a brittleness, and the completed post structures particularly are subject to failure in wind load induced torsion. In order to provide a splicing interconnection between the two signpost components adequate to overcome wind loads, it is necessary that the two post configurations abut or nest together and that they be fastened by break away bolts which are spaced an adequate distance apart, typically four inches. Generally, the posts will be formed having spaced apart apertures along their central lengths which field personnel align and then install breakaway bolts at specified vertical spacings. A difficulty earlier has been identified in connection with the splicing together of nested channel-formed signpost components. In this regard, the component cross-sectional configurations often do not nest. When this occurs, the breakaway bolts may be subjected to excessive moment induced stresses to cause premature failure of the signs under wind load. Granger addressed this problem in an approach described in U.S. Pat. No. 5,125,194 entitled "Safety Signpost with Break Away Connection", issued Jun. 30, 1992. With the early Granger approach, field personnel were called upon to install spacers between the channel sections such that the contact surfaces of the channel sections were brought together against the spacer notwithstanding their failure to otherwise nest. To provide such correction procedures, field personnel are trained and provided with written and diagrammatic instructions as to the use of the spacers and requisite splice spacing of the break away bolts.

In practice, however, it has been observed that such procedures often are not followed, due in part to the physical difficulties encountered by field personnel while erecting signs under even mild wind conditions. Frustrated under such circumstances, such field personnel will ignore requisite longitudinal bolt spacing and omit spacers. The result may be the subsequent loss of signage due to wind load induced torsional stress.

SUMMARY

The present invention is addressed to a signpost and the method of its erection wherein the close, mutually contacting, nesting of channel-form post components at a breakaway splice is avoided. Further, a proper spacing of breakaway bolts is assured to develop proper windload resistance and human error is minimized to the extent that fully functional splicing is achieved even when the lower, terrain inserted component of the sign post is installed backwards. These advantages are achieved through the utilization of a stress transfer component which is designed having contact surfaces of a width which is predetermined to the extent that it is capable of nesting in stress transfer relationship with the aperture containing connecting surfaces of upper and lower sign post components. The stress transfer component has a thickness dimension adequate to assure that the side members and flanges of U-channel type signpost components are spaced apart and thus, moment induced loadings upon breakaway bolts are eliminated. Further, the stress transfer component is formed having two parallel fastener receiving channels or boltways which are provided, typically, as bores which are spaced apart a predetermined integer multiple of the spacing distance between the apertures on the upper and lower support components. This fixes the spacing of bolts used at the splice such that the splice will always be within specification. The breakaway bolt and stress transfer component also enjoys the advantage of permitting a form of assembly which is much easier for field personnel. In this regard, the spaced apart bores within the stress transfer component may be internally threaded and the stress transfer component may be fully attached or assembled with the breakaway bolts to form a preassembly with end portions of the bolt protruding as studs for receiving the opposite support component, for example the upper support component. This substantially facilitates the positioning of the upper component under wind loads and the like. As a further feature, a supervisory aspect of the sign erection function may be employed through the utilization of a preassembly, for example, of the upper component of the sign post with the stress transfer component under controlled, in-shop conditions. The preassembly, then of the upper component with stress transfer component can be attached to the lower component following the driving of the lower component into terrain.

In a preferred embodiment, the two boltways provided within the stress transfer component are threaded only to establish a retainer threaded region along the boltway axis of a predetermined limited extent. This limited extent may, for example, be provided as two or three threads. The preferred type bolt used with this arrangement is one having a threadless shank extending from its head to a threaded connector region. Such bolts are more readily available in the marketplace as opposed to fully threaded bolts. To accommodate this form of bolt, the boltways are formed having an initial diameter for receiving the threadless shanks which is of larger extent than the diameter of the bolts to permit slidable insertion most of the way throuh the boltways. The retainer threaded region, on the other hand, is formed with a diameter of lesser extent than the bolts to permit threaded engagement. In the process of tightening the bolts in connection with the stress transfer component, this threaded enagement is stripped such that their pre-assembly engagement confiburation is deformed. Fortuitously, the stress transfer component remains in engagement in a preassembly configuration, even though the bolts are stripped. Of particular advantage in this configuration is the connective association where the bolts may yield in stress in the boltway under pretension to provide a higher quality structural interconnection of the sign post upper support and lower support components. Because the bolt is essentially freely slidable within the boltways when the assembly is complete, the structural state of the splicing joint is definable, no threaded engagement restricting the yielding of the bolts.

Carrying out the noted deformation of the preassembly engagement of bolt and stress transfer component preferably is made either by torqueing the heads of the bolts of the preassembly prior to attaching the nuts, or by tightening the nut after completion of the entire assembly. To achieve the noted advantageous structural definition of the joints, it is preferred that the stress transfer component be formed of a steel which is milder or of lesser carbon content than the steel employed for the bolts. Thus, thread stripping will be with respect to the small number of threads formed within the stress transfer component.

Other objects of the invention will, in part, be obvious and will, in part, appear hereinafter. The invention, accordingly, comprises the apparatus and method possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective view of the sign post of the invention showing it with a break-away splice as installed upon terrain;

FIG. 2 is a partial exploded view of the sign post of FIG. 1 taken at the splice region thereof;

DETAILED DESCRIPTION

Figure 3:
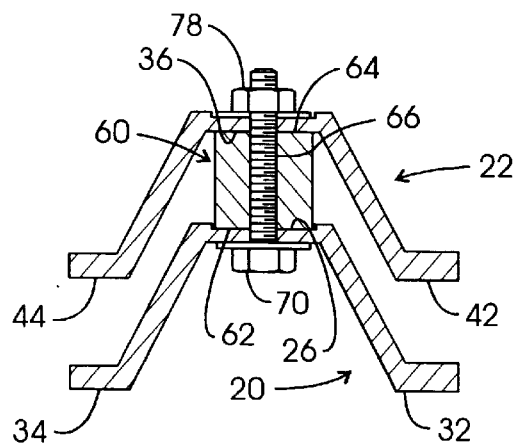
FIG. 3 is a sectional view taken through the plane 3—3 shown in FIG. 1.

Referring to FIG. 1, a small sign installation is represented generally at 10. Installation 10 is shown comprised of a visual cuing sign, carrying letters spelling out the word "stop" within a mandated octagonal periphery. Sign 12 is attached to a sign post represented generally at 14 by two bolts 16 and 18. Sign post 14 is formed with two components, a lower support component or stub post 20, and an elongate upper support component 22 which are joined at a breakaway splice represented generally at 24. The cross section depicted for components 20 and 22 is of the earlier-noted U-channel or flanged channel variety. For the case of lower support component 20 a connecting surface 26 as seen in FIG. 2 is established at its central region. The cross section also includes two angularly outwardly disposed sidewalls 28 and 30 from which outwardly extend respective flanges 32 and 34. Upper support component 22 is identically structured having a connecting surface 36 located intermediate outwardly and angularly disposed sidewalls 38 and 40. Sidewalls 38 and 40 are integrally formed with outwardly disposed flanges shown, respectively, at 42 and 44. The lengthwise extents of connecting surfaces 26 and 36 are formed having regularly spaced, linearly and longitudinally aligned apertures or holes, certain of which are represented, respectively, at 46 and 48. This predetermined spacing may, for example, be at one inch centers.

In general, the steel from which components 20 and 22 are formed is a stock steel channel material having a high carbon content so as to be relatively brittle. The lower and upper channel sections 20 and 22 are made of material with a yield stress of 80–100 ksi, generally conforming to ASTM A499 (re-roll rail steel), but made from new billets. Lower component 32 typically will extend about 3 ½ feet into the ground or terrain, and protrude, for example, about 4 inches thereabove at its upper end as represented at 50 in connection with the terrain representation 52. FIG. 1 further reveals that the splice 24 is provided through the union of the upper portion 50 of lower support component 20 with the lower end 54 of upper support component 22, the sign 12 being coupled at the upper end of component 22.

Accommodation for the moment-based overloading of fasteners occasioned by a lack of nesting of U-channel post components as at 20 and 22, as well as to inherently assure that proper fastener-to-fastener spacing, for example 4 inches, is achieved in erecting the signs through utilization of a stress transfer spacing approach. In this regard, a stress transfer bar represented generally at 60 is employed at the breakaway splice 24. Additionally, the device 60 will be seen to facilitate field assembly. For example, the field worker is not required to undertake the awkward procedures of the past, i.e. insert a bolt and washer through one post component, then provide a spacer and then while supporting that sub-assembly and holding the upper component of the sign post with sign attached in one hand, inserting the bolt assembly through a next aperture in the second component. That procedure generally has led to the frustration leading to improper bolt spacing and the like. Stress transfer bar 60, for example is formed of cold rolled steel, having a length of about 6 inches, and a square cross section, for example, of about ¾ inch×¾ inch. The particular width of the transfer bar 60 is selected as corresponding with the lesser width of connecting surface 26 or connecting surface 36. For the illustration shown, that lesser width will be at connecting surface 26. In other applications, the two connecting surface widths will be the same. This width of the transfer bar 60 defines parallel contact surfaces 62 and 64 which extend along in substantially continuous contact with respective connecting surfaces 26 and 36. To properly position the fasteners associated with splice 24, the stress transfer bar 60 is formed having two parallel fastener receiving channels, here shown as through bores 66 and 68. Fastener receiving channels 66 and 68 are spaced apart a predetermined integer multiple of the spacing distance between apertures 48. In particular, for the embodiment shown, where the spacing of apertures 46 and 48 is one inch center-to-center, then it is preferred that the center-to-center spacing of channels 66 and 68 be 4 inches. Also, for the embodiment shown, it is preferred that these channels or bores 66 and 68 be tapped or threaded. With such an arrangement, the fastener components provided as fully threaded break-away bolts 70 and 72 along with respectively associated washers 74 and 76 may be pre-assembled with stress transfer bar 60 with no requirement for simultaneously manipulating the upper signpost component 22. The result will be a completely fastened stress transfer bar 60 to the connecting surface 26 as a preliminary step in erecting signpost component 22. Proper spacing of the bolts 70 and 72 along the longitudinal extent of components 20 and 22 is assured by the bores 66 and 68.

With relative ease, the upper component 22 then may be moved into adjacency with the pre-assembled component 20 and stress transfer bar 60 such that the outwardly extending bolt components are received within the apertures as at 48 at proper spacing and connecting nuts as at 78 and 80 along with washers shown, respectively at 82 and 84, then may be positioned and tightened to an appropriate torque. In general, bolts 70 and 72 are provided as grade 9 steel, for example with a ⁵⁄₁₆th inch diameter. The washers also are grade 9 steel. As seen in FIG. 3, the resultant connection provides a substantially continuous contact between connecting surface 26 and contact surface 62 as well as between connecting surface 36 and contact surface 64. This permits a transfer of stress from the component 22 carrying wind induced torsional loads and the like from sign 12. That transfer is entirely through those mated surfaces such that no spurious moment induced high loadings are imposed upon the break-away bolts 70 and 72 by windloads. Typically, washers as at 82 and 84 are provided in connection with the coupling of nuts 78 and 80. For some applications, run-away straps as at 90 (FIG. 2) may be coupled to the assembly in connection with bolt 70. In this regard, the strap 90 is connected through its aperture 92 to lower component 20 and bolt 70. A bolt 94 then is extended through aperture 96 of strap 90 and thence through an aperture or hole 48 within upper component 22 to be secured by a nut and washer combination 98 and 100. The length of strap 90 is selected for purposes of dissipating energy during a breakaway procedure, and the strap 90 functions to control injury from broken away component 22 in the event of impact with an errant motor vehicle. To provide adequate length, inter alia, for breakaway energy dissipation while retaining a conveniently installable configuration, the strap is stress looped as at 91. Loop 91 provides a coiled intermediately disposed storage portion of length selected to permit an energy dissipation but ground retention of the signpost upper component following an impact of level causing break away phenomena. Alternately, the strap may be formed of stressed wire rope. Loop retention may be developed with other tecuniques such as paraffin potting.

Figure 4:
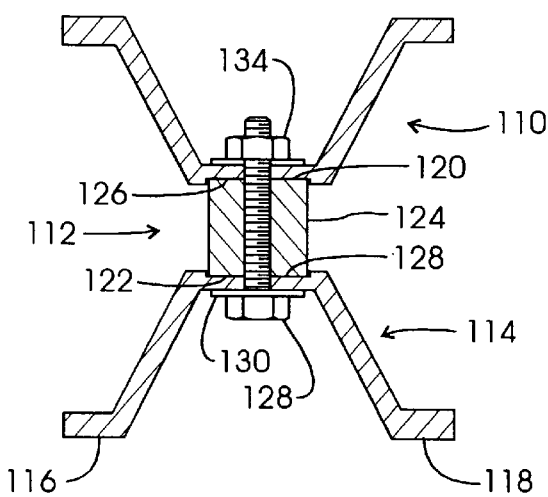
FIG. 4 is a sectional view similar to FIG. 3 but illustrating the utilization of the invention in conjunction with an improperly oriented ground-mounted lower component.

The embodiment of FIGS. 1–3 wherein channels or bores 66 and 68 are tapped or internally threaded and the breakaway bolts 70 and 72 are fully threaded lends itself to a pre-assembly approach wherein supervisory authority may be invoked over field personnel before the sign components 20 and 22 are permitted to leave a central location or shop. In this regard, the stress transfer bar 60 may be pre-assembled to the upper component 22 under supervision. Mounting in the field then involves merely sliding the extensions of bolts 70 and 72 as they emerge from contact surface 62 into the corresponding apertures of lower component 20. Thus, upper component 22 sub-assembly is readily retained in position while nuts and washers are tightened upon the extensions of the breakaway bolts. For the sub-assembly, the nuts 70 and 72 as shown in FIG. 2 would be inserted in an opposite sense as illustrated therein. Proper mounting of signs as at 12 upon the U-channel type upper components 22 is one wherein the flange components 42 and 44 provide an additional outrigger form of support against the back of the sign. Typically, the lower components 20 are inserted in the terrain using a rig similar to a pile driver to assure verticality. Of course, they can simply be driven into the ground with a sledgehammer or the like. Instances may occur where the lower component 20 is inserted backwards. Where that is the case, the upper component 22 still can be attached to the properly oriented lower component through employment of the stress transfer bar 60 without loss of strength at the splice 24. Such an arrangement is represented in FIG. 4. Here, a lower component, shown generally at 110, having the U-channel shape may be assumed to have been inserted in the ground in a backwards or reverse sense. The splice coupling represented generally at 112 retains its full integrity. In this regard, the upper component 114 remains in its proper orientation with outrigger flanges 116 and 118 facing in an appropriate direction for supporting a sheet steel or the like sign. Earlier described connecting surface 26 is now presented at 120 and the corresponding connecting surface for upper component 114 is located on an opposite side from that earlier described at 36, being shown in FIG. 4 at 122. A stress transfer bar 124 is connected between the lower component 112 and upper component 114 such that its contact surface 126 continuously engages connecting surface 120 and its parallel and oppositely disposed contact surface 128 substantially continuously engages connecting surface 122. As before, breakaway bolts and associated washers and nuts are used to complete the splice 112, one such assembly being represented at bolt 128, washer 130, washer 132, and nut 134.

Figure 5:
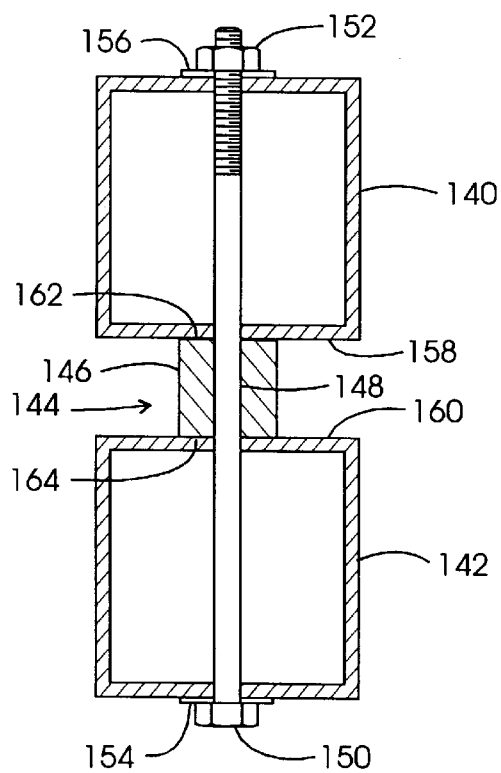
FIG. 5 is a sectional view showing the utilization of the invention in connection with sign post components of box beam configuration.

Referring to FIG. 5, the stress transfer bar based splicing arrangement is shown employed in conjunction with box beam sign post components having a square cross-sectional configuration. In this regard, a lower component represented at 140 is provided which is positioned in anchoring relationship with the terrain. The lower component 140 will have regularly spaced linearly vertically oriented apertures as in the case of the U-channel components. A corresponding upper component having a box beam configuration is shown at 142. As before, the component 142 will have regularly spaced vertically linearly oriented apertures formed therein for connection both with a sign as well as a break-away splice represented generally at 144. To form the splice, as before, a stress transfer bar 146 is employed having non-threaded, parallel fastener receiving channels formed therein with a predetermined specified vertical spacing. Each channel is provided as at 148. Lower component 140 and upper component 142 then are joined at the splice 144 by two break-away bolts, one of which is seen at 150. Bolt 150 is seen to extend through apertures formed in upper component 142, thence through fastener receiving channel 148, and through corresponding apertures within lower component 140. A nut 152 completes the assembly. Optionally, washers as at 154 and 156 may be employed at the splice 144. It may be observed that a connecting surface 158 is defined by one aperture containing surface of component 140 while a corresponding connecting surface 160 is defined at one aperture containing surface of upper component 142. Stress transfer bar 146, as before, is configured having a contact surface 162 substantially in continuous contact with connecting surface 152 and a parallel, oppositely disposed contact surface 164 in similar engagement with connecting surface 160. This assures appropriate transfer of torsional stresses and the like from the upper component 142 to the lower component 140 and, importantly, insures a correct vertical spacing of the two bolts employed, one of which is shown at 150.

Figure 6:
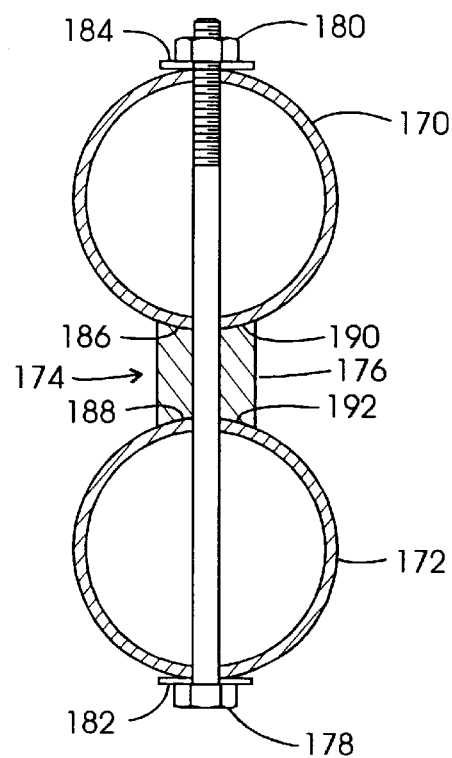
FIG. 6 is a sectional view of another embodiment of the invention showing a splicing arrangement employed with a sign post of pipe configuration.

Referring to FIG. 6, an implementation of the spliced sign post using pipe components is illustrated. A lower component is represented in the figure at 170. This component 170 will be positioned and anchored within the terrain and will have a longitudinal, regularly spaced sequence of apertures extending through it. The upper component of the sign post is represented at 172 and also will have the same type of linearly disposed, regularly spaced apertures generally extending along its length. The lower portion of upper component 172 and the upper, exposed portion of lower component 170 are spliced as represented in general at 174 with the utilization of an elongate stress transfer bar 176. Bar 176 is relatively elongate, having two parallel fastener receiving channels present as bores at a mutual spacing which is predetermined or pre-specified. These channels dictate or mandate the vertical spacing of fasteners such as elongate bolts, one of which is shown at 178 in association with a nut 180 and washers 182 and 184. With the arrangement shown, a connecting surface 186 is defined adjacent the aperture of component 170, while a corresponding connecting surface 188 is disposed along the linear aperture grouping of upper component 172. To provide substantially continuous contact between these surface 186 and 188, and corresponding connecting surfaces of the stress transfer bar 176, the connecting surface as at 190 of transfer bar 176 is machined or radiused in correspondence with the radius of the outside surface of pipe component 170. Similarly, the connecting surface 192 which is oppositely disposed from surface 190 is concavely radiused in correspondence with the radius of the outer surface of upper pipe component 172. Accordingly, the spacing of two as at 178 is mandated with the arrangement and a structurally more secure splice 174 is achieved to improve the integrity of the break-away feature of the signpost.

Figure 7:
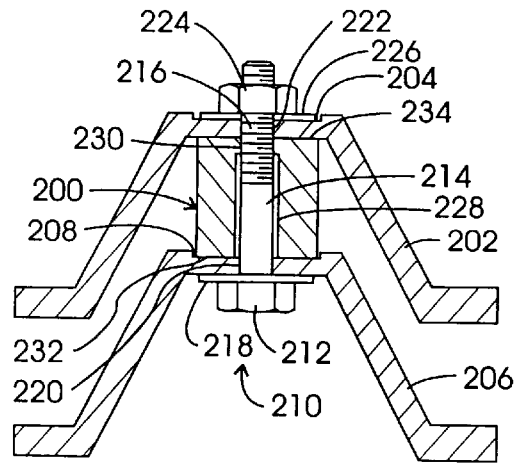
FIG. 7 is a sectional view of a preferred embodiment of the invention showing a splicing arrangement.

Referring to FIGS. 7 through 10, a preferred signpost and associated breakaway splicing arrangement is portrayed. In FIG. 7, a stress transfer component represented generally at 200 is shown interconnecting a signpost support component 202. Component 202 as before, is shown to be of a variety having an outwardly disposed shallow indentation or groove 204. Component 202 is connected by the stress transfer component 200 to a second sign support component 206 which similarly has a shallow indentation or groove 208. As before, the sign support components as at 202 and 206 are are retained under preload against the stress transfer component 200 by two fastener assembly which includes two spaced apart bolts, one of which is shown in general at 210. Bolt 210 is shown to have a bolt head 212 from which extends a threadless shank which extends to a threaded connector region 216. Bolt 210 is used with a washer 218 and extends through an aperture 220 within sign support component 206, thence through stress transfer component 200 and through an aperture 222 within sign support component 202 to be coupled thereto by a nut 224 used with a washer 226.

Figure 8:
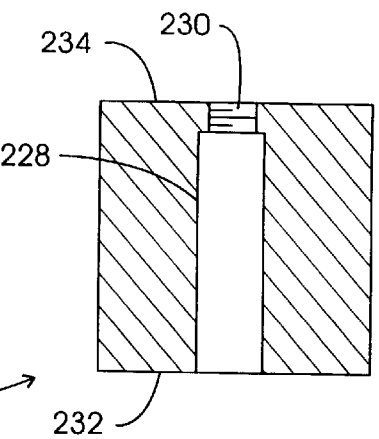
FIG. 8 is a sectional view of a stress transfer component employed in the splice of FIG. 7.

Looking additionally to FIG. 8, the stress transfer component is seen to have a rectangular, in this case square, cross-section. The component 200 incorporates two spaced-apart boltways as in the earlier embodiments. However, each of the boltways is formed as an unthreaded or smooth bore 228 to a retainer threaded region 230. As before, the bore extends between oppositely disposed contact surfaces 232 and 234. In general, the components 228 and 230 of the boltway are formed with a two stage bit, that providing the bore at 230 being of lesser diametric extent than that providing the bore 228. Following this initial formation of the boltway, then a small number of threads are formed at region 230, for example two or three threads. This number of threads is selected such that a preassembly may be fashioned, for example, a connection of bolt 210 with signpost support component 206 and the stress transfer component 200. This preassembly is made by assembling the bolt 210 with washer 218 through aperture 220 with the stress transfer component 200. The stress transfer component is retained upon the preassembly by virtue of the tightening of the threaded connector region 216 of the bolt 210 into the retainer threaded region 230 of stress transfer component 200. This tightening may be to an extent wherein the bolt head 212 is turned with a torque sufficient to strip the threads at threaded region 230. This occurs because of the smaller number of threads at 230 and repesents a preferred arrangement for the approach now taken. Fortuitously, when those threads are stripped, the preassembly will remain intact for coupling to sign support component 202 at aperture 222 utilizing the nut 224 and washer 226. The result is a splice or joint which is structurally defined in that the shank portion 214 and the threaded connector region 216 are substantially released for minor deformation in yield occasioned by pre-stressing. Such minor deformation is advantageous in defining the structural connection, more elongation being made available to the connection. In this regard, a rod or bolt will stretch under a load in accordance with the general relationship e=Pl/AE, where e is total elongation, P is load, l is rod length, A is cross-sectional area of the bolt, and E is longitudinal modulus of elasticity, the weight of the bolt itself being ignored. The stripping of the threads at region 230 as opposed to the stripping of the bolt thread 216 additionally is caused by selection of the type steels involved. In this regard, the stress transfer connector preferably is formed of a low carbon steel, while bolt 210 is selected from a steel of higher carbon content. For example, the carbon content of stress transfer connector 200 may be about 0.17 to 0.28% while the corresponding carbon content exhibited by bolts 210 may be about 40% by weight. The stripping action calls for the accomodation of the steel material which is stripped from region 230. For the assembly arrangement described above, the steel material removed by stripping moves into an available area within boltway region 228 which is of larger diameter. In a typical configuration, that boltway will have a diameter of ⅜ inch while the bolt shank diameter will be ⁵⁄₁₆ inch. Typically, the extent of the threaded region 230 is less than the basic minor diameter of bolt 210.

Another assembly approach is available with the present splice. In this regard, the noted preassembly of bolt 210, washer 218, and sign support component 206 is made with the initial threaded interconnection of bolt threaded connector region 216 with the retainer threaded region 230. As before, the extended bolts are inserted within apertures as at 222 in the sign support component 202 and the nut 224 and washer 226 are coupled to the bolt 210. Then, torqueing takes place by rotation of the nut 224 to strip the threads at threaded region 230 by virtue of the elongation of bolt 210. The stripped material then moves in an opposite direction. However, the apertures of the units 202 are of sufficient diameter to accommodate the movement of stripped steel material from region 230 thereinto.

In addition to the advantageous development of a structurally defined joint or splice, current market conditions also reveal that bolts configured having a threadless shank 214 are more readily available to the signage industry.

Figure 9:
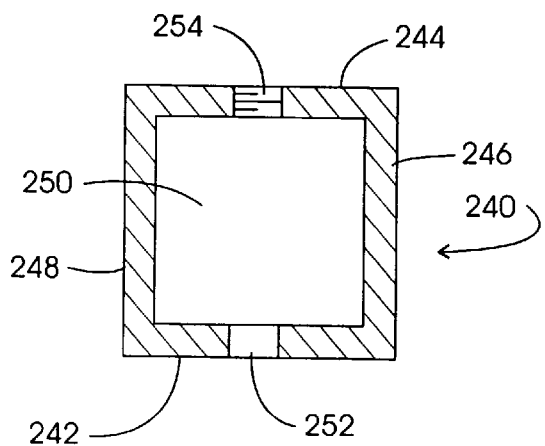
FIG. 9 is a sectional view of an alternative embodiment for FIG. 8 showing the utilization of square steel tubing.

Looking to FIG. 9, an adaptatio of the stress transfer component 200 is revealed at 240. Because stress transfer components as at 200 are provided to the highway and traffic industry in substantial numbers, the amount of steel involved can be substantial, and the weight thereof becomes a factor in, for example, shipping. The stress transfer component 240, haa the same dimensions, i.e. about 1 inch square and about 6 inches long as component 200. However, component 240 is formed of rectangular or square steel tubing. In this regard, it is seen to have oppositely disposed contact surfaces 242 and 244 serving the same function as the contact surface seen in FIG. 8, respectively, at 232 and 234. These contact surfaces are structurally associated by sidewalls 246 and 248 and the arrangement provides an open interior 250. The two boltways for component 240 are relatively simply formed, for example, as a bore 242 for receiving the threadless shank portions 214 of bolts as at 210. A retainer threaded region as described in FIG. 8 at 230 is provided for the component 240 at 254. This threaded region will be formed from a bore of lesser diametric extent than boltway openings as at 242. By virtue of the rectangular tube configuration, the bulk weight of the stress transfer components is substantially reduced. The component 240 may, for example, be made having a 1 inch outer dimension with a square cross-section. Where the wall thickness is 0.120 inch, the stock forming the devices fabricated in accordance with the invention will exhibit a weight of about 1.44 pounds per foot. Alternately, the wall thickness may be made 0.072 inch to provide a stock weight of about 0.91 pounds per foot. By contrast, devices as at 200 will be formed from stock exhibiting a weight of about 3.4 pounds per foot.

Figure 10:
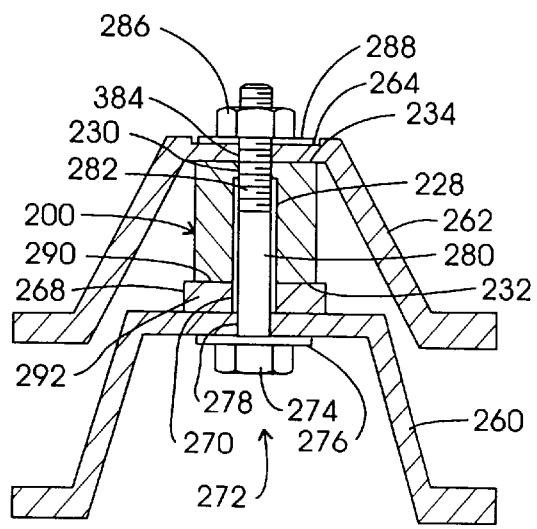
FIG. 10 is a sectional view of a splice configuration showing the utilization of the stress transfer component shown in FIG. 8 in conjuction with a supplementary stress transfer component.

An aspect of the stress transfer components 200 or as at 240 desired in the industry is that of providing applicability to the sign support components of a variety of manufacturers. These components have varying cross-sectional shapes, and it is desirable to be able to splice the sign support component of one manufacturer with the different sign support component of another manufacturer. For some combinations of these components with their varying cross-sectional geometric shapes, it is desirable to provide an enhanced dimension spacing the sign post components apart. With the present connecting approach, a supplementary stress transfer component is supplied which may be used from time to time to meet an unusual combination of supports from various manufacturers. FIG. 10 reveals such an unusual combination where a sign support component 260 having on cross-sectional configuration is spliced with sign support component 262 having a different configuration, for example, including a shallow indentation or groove 264. A stress transfer component as described at 200 in FIG. 8 is used with this uniting of components 260 and 262. Accordingly, the same numertion as employed in connection with FIG. 8 is employed in the instant figure. However, a supplementary stress transfer component 268 is provided which has two receiving channels or bores formed therein corresponding in diameter with and in alignment with the boltways associated with device 200. One such receiving channel is shown at 270. Preferably, the stress transfer component 200 will have a cross-section representing a one inch square and a length of 6 inches. The boltways formed therein will have a center-to-center spacing of 4 inches in correspondence with the sign support component aperture spacings. Correspondingly, the supplementary stress transfer component 268 will have the same 6 inch lengthwise extent with the formation of receiving channels as ⅜ inch bores spaced center-to-center at 4 inches. The thickness of component 268 preferably is about ¼ inch and its widthwise extent preferably is expanded to about 1 ¼ inches. In general, component 268 may be made of the same type steel as component 200.

With the exception of the condition of supplementary stress transfer component 268, the interconnection utilizing stress transfer component 200 is the same as that shown and described in connection with FIG. 7. In this regard, a bolt 272 having a head 274 and threadless shank component 280 is inserted through an aperture 278 within sign support component 260. Shank 280 extends to a shreaded connector region 282. The shank region 280 is seen to extend through receiving channel 270 of the supplementary stress transfer component 268 and thence into the boltway of stress transfer component 200, in particular into the bore 228. Bolt 274 then is preliminarily threaded into the threads at retainer threaded region 230 of the device 200. As discussed above, the head of bolt 274 may be turned under torque to strip the thread at region 230 or, alternately, the stripping may be carried out by the tightening of the associated nut of the connector assembly at a later time. In any case, this preassembly then is connected to the sign support component 262 by inserting it through appropriate apertures as at 284 in the unit 232. A nut as at 286 along with washer 288 then is installed and tightened.

With the supplementary arrangement shown, one supplementary contact surface 290 of supplementary stress transfer component 268 is in stress transfer abutment with contact surface 232 of component 200, while its opposite supplementary contact surface 292 is in stress transfer contact with a connecting surface of sign support component 260.

The material utilized for the devices as at 200, 242, and 268 may be formed of carbon structural steel having an ASTM designation A 36. Bolts as at 210 supplied with the structure at hand may be provided, for example, as type PFC cap screws having a diameter of 5/16 inch and the threaded regions thereof having 18 threads per inch. In general, these bolts will exhibit a tensile strength in pounds of 9,430 pounds, and a proof load of 7,860 pounds. The bolts are marketed, for example, by Fastenal Company, Winona, Minn. 55987-0978.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. A signpost, comprising:

a lower support component for anchoring positioning below a surface of terrain and having an upper portion for extension a predetermined distance above said surface with a first connecting surface of predetermined first widthwise configuration having apertures therein longitudinally spaced apart a predetermined spacing distance;

an upper support component having an upper end for supporting connection with a sign and a lower end with a second connecting surface of second predetermined widthwise configuration having apertures therein spaced apart said predetermined spacing distance;

a stress transfer component formed of predetermined material having a widthwise extent substantially corresponding with or less than one said predetermined first and second widthwise configuration to define oppositely disposed contact surfaces spaced apart a thickness dimension effective to position said upper support component in spaced apart relationship from said lower support component, each said contact surface being positioned in stress transferring contact with one said first and second connecting surface, said transfer component having first and second parallel boltways extending along respective boltway axes normally to said contact surfaces and spaced longitudinally apart along the length of said stress transfer component a predetermined integer multiple of said predetermined spacing distance selected to structurally retain said upper support component upon said lower support component in the presence of wind loads upon said sign, said first and second boltways incorporating a retainer threaded region along the said boltway axis thereof of predetermined limited extent;

first and second fastener assemblies including respective first and second bolts exhibiting predetermined tensile strength characteristics, each having a head from which depends a shank extending to a threaded connector region, each said first and second bolts extending through respective first and second boltways and the threaded connector regions thereof having a deformable preassembly engagement configuration with said retainer threaded region, said first and second fastener assemblies including first and second nuts threadably engageable with the said threaded connector regions of respective said first and second bolts to retain said first and second connecting surfaces in stress transfer relationship with said contact surfaces while providing for the tightening of said first and second fastening assemblies to an extent deforming said pre-assembly engagement configuration.

2. The signpost of claim 1 in which:

said retainer threaded region of said first and second boltways extend inwardly from a said contact surface a distance less than the base minor diameter of a respective said first and second bolt at the threaded connector region thereof.

3. The signpost of claim 1 in which:

said retainer threaded region of said first and second boltways comprises about two screw thread turns.

4. The signpost of claim 1 in which:

each said first and second bolts comprise a threadless shank region extending intermediate said head and said threaded connector region; and said first and second bolts being slideable in stress induced strain within respective said first and second boltways subsequent to said deforming tightening.

5. The signpost of claim 1 including:

a supplementary stress transfer component having a widthwise extent greater than the said widthwise extent of said stress transfer component, having a thickness dimension less than said stress transfer component thickness dimension and parallel oppositely disposed supplementary contact surfaces, having two receiving channels extending therethrough and each in alignment with one of said first and second boltways, one said supplementary contact surface being positioned in abutting adjacency with a said stress transfer component contact surface and the opposite supplementary contact with one said first and second connecting surface.

6. The signpost of claim 5 in which:

said widthwise dimension and said thickness dimension of said stress transfer component are about one inch;

said widthwise dimension of said supplementary stress transfer component is about one and one fourth inches; and said thickness dimension of said supplementary stress transfer component is about one fourth inch.

7. The signpost of claim 1 in which:

said stress transfer component predetermined material is steel with a carbon content within the carbon content range for low-carbon steel; and said first and second bolts are configured of steel with a carbon content greater than the said carbon content of the steel forming said stress transfer component.

8. The signpost of claim 1 in which said widthwise dimension and said thickness dimension of said stress transfer component are about one inch.

9. The signpost of claim 1 in which said stress transfer component is formed from a length of rectangular steel tubing.

10. The signpost of claim 1 in which:

each said first and second bolts comprise a threadless shank region extending intermediate said head and said threaded connector region, each shank region and threaded connector region having a predetermined outer diameter and said first and second bolts being formed of a steel of predetermined hardness;

said stress transfer component is formed of a steel exhibiting a hardness less than said predetermined hardness and said first and second boltways having diameters less than said predetermined outer diameter at said retainer threaded region and diameters greater than said predetermined outer diameter extending from said retainer threaded region.

11. A method for erecting a signpost comprising the steps of:

(a) providing a lower support component having a lower portion, an upper portion, a first connecting surface of predetermined first widthwise configuration with apertures therein longitudinally spaced apart a predetermined spacing distance;

(b) providing an upper support component having an upper end for supporting connection with a sign and a lower end with a second connecting surface of second predetermined widthwise configuration with apertures therein longitudunally spaced apart a predetermined spacing distance;

(c) providing a stress transfer component formed of predetermined material having a widthwise extent substantially corresponding with or less than one said predetermined first and second widthwise configuration to define oppositely disposed contact surfaces spaced apart a thickness dimension effective to position said upper support component in spaced apart relationship with said lower support compoent, said transfer component having first and second parallel boltways extending along respective boltway axes normally to said contact surfaces and spaced longitudinally apart along the length of said stress transfer component a predetermined integer multiple of said predetermined spacing distance, said first and second boltways incorporating a retainer threaded region of limited extent along said boltway axis thereof;

(d) providing first and second fastener assemblies including respective first and second bolts exhibiting predetermined tensile breaking characteristics, each having a head from which depends a shank extending to a threaded connector region, said first and second fastener assemblies including first and second nuts threadably engageable with the said threaded connector regions of respective said first and second bolts;

(e) anchoring said lower support component lower portion in terrain to an extent exposing substantially only said upper portion;

(f) attaching said stress transfer component to said lower support component upper portion with said first and second bolts by inserting said first bolt through a said lower support component aperture at said upper portion, thence into said first boltway and by rotation of the head thereof into threadably engaged relationship with said retainer threaded region thereof to establish a pre-assembly engagement configuration, and inserting said second bolt through a said lower support component aperture at said upper portion, thence into said second boltway and by rotation of the head thereof into threadably engaged relationship with said retainer threaded region thereof to establish a pre-assembly engagement configuration, each said first and second bolt extending a connecting distance beyond said stress transfer component thickness dimension;

(g) positioning said upper support component lower end upon said stress transfer component by effecting movement of two of the apertures therein over said extended first and second bolts;

(h) attaching said first nut to said first bolt;

(i) attaching said second nut to said second bolt; and (j) tightening said first and second bolts to effect thread stripping deformation of said pre-assembly engagement configuration.

12. The method of claim 11 including the steps of:

providing a supplementary stress transfer component having a widthwise extent greater than the said widthwise exent of said stress transfer component, having a thickness dimension less than said stress transfer component thickness dimension and parallel oppositely disposed supplementary contact surfaces, having two receiving channels extending therethrough and each in alignment with one of said first and second boltways;

subsequent to said step (f), mounting said supplementary stress transfer component upon said stress transfer component by extending said receiving channels over said extended first and second bolts to locate one said supplementary contact surface in abutting adjacency with a said stress transfer component transfer surface;

positioning said upper support component lower end upon said supplementary stress transfer component by effecting movement of two of the apertures therein over said extended first and second bolts; and reiterating steps (h) through (j).

13. The method of claim 11 in which:

said step (j) occurs subsequent to said steps (a) through (i) and is carried out by torque inducing rotation of said first and second nuts.

14. The method of claim 11 in which:

said step (j) is caried out by applying torque inducing rotation of the heads of said first and second bolts; and said steps (g) through (i) are carried out subsequent to said step (j); and including the step of:

(k) tightening said first and second fastening assemblies to effect stress transferring engagement of said upper support component with said lower support component through said stress transfer component.

15. The method of claim 11 in which:

said step (j) is carried out by applying torque inducing rotation to said first and second nuts; and said steps (g) through (i) are carried out prior to said step (j); and including the step of:

(k) tightening said first and second fastening assemblies to effect stress transferring engagement of said upper support component with said lower support component through said stress transfer component.

16. The method of claim 11 in which:

said step (j) is carried out by applying torque inducing rotation to said first and second nuts; and said step (g) through (i) are carried out prior to step (j).

17. A method for erecting a signpost comprising the steps of:

(a) providing a lower support component having a lower portion, an upper portion, a first connecting surface of predetermined first widthwise configuration with apertures therein longitudinally spaced apart a predetermined spacing distance;

(b) providing an upper support component having an upper end for supporting connection with a sign and a lower end with a second connecting surface of second predetermined widthwise configuration with apertures therein longitudunally spaced apart a predetermined spacing distance;

(c) providing a stress transfer component formed of predetermined material having a widthwise extent substantially corresponding with or less than one said predetermined first and second widthwise configuration to define oppositely disposed contact surfaces spaced apart a thickness dimension effective to position said upper support component in spaced apart relationship with said lower support compoent, said transfer component having first and second parallel boltways extending along respective boltway axes normally to said contact surfaces and spaced longitudinally apart along the length of said stress transfer component a predetermined integer multiple of said predetermined spacing distance, said first and second boltways incorporating a retainer threaded region of limited extent along said boltway axis thereof;

(d) providing first and second fastener assemblies including respective first and second bolts exhibiting predetermined tensile breaking characteristics, each having a head from which depends a shank extending to a threaded connector region, said first and second fastener assemblies including first and second nuts threadably engageable with the said threaded connector regions of respective said first and second bolts;

(e) providing a pre-assembly by attaching said stress transfer component to said upper support component lower end with said first and second bolts by inserting inserting said first bolt through a said upper support component aperture at said lower end, thence into said first boltway and into threaded engagement with said retainer threaded region thereof, and inserting said second bolt through a said upper support component aperture at said lower end, thence into said second boltway and into threaded engagement with said retainer threaded region thereof, each said first and second bolt extending a connecting distance beyond said stress transfer component thickness dimension;

(f) anchoring said lower support component lower portion in terrain to an extent exposing substantially only said upper portion;

(g) positioning said stress transfer component of said preassembly at said lower support component upper portion in a manner inserting said extended first and second bolts through said apertures therein;

(h) attaching said first nut to said first bolt;

(i) attaching said second nut to said second bolt; and (j) tightening said first and second bolts to effect thread stripping deformation of said pre-assembly engagement configuration.

18. The method of claim 17 including the steps of:

providing a supplementary stress transfer component having a widthwise extent greater than the said widthwise extent of said stress transfer component, having a thickness dimension less than said stress transfer component thickness dimension and parallel oppositely disposed supplementary contact surfaces, having two receiving channels extending therethrough and each in alignment with one of said first and second boltways;

subsequent to said step (e), mounting said supplementary stresss transfer component upon said stress transfer component by extending said receiving channels over said extended first and second bolts to locate one said supplementary contact surface in abutting adjacency with a said stress component contact surface; and carrying out said step (g) by positioning said stress transfer component preassembly, with said abutting supplementary stress transfer component, at said lower support component upper portion by inserting said extended first and second bolts through said apertures therein.

19. The method of claim 17 in which:

said step (j) is carried out by applying torque inducing rotation to said first and second nuts; and said steps (g) through (i) are carried out prior to said step (j); and including the step of:

(k) tightening said first and second fastening assemblies to effect stress transferring engagement of said upper support component with said lower support component through said stress transfer component.

20. The method of claim 17 in which:

said step (j) is carried out by applying torque inducing rotation to said first and second nuts; and said step (g) through (i) are carried out prior to step (j).

* * * * *